(12) United States Patent
Gronowicz, Jr. et al.

(10) Patent No.: US 9,365,170 B2
(45) Date of Patent: Jun. 14, 2016

(54) GROMMET ASSEMBLY

(75) Inventors: William Gronowicz, Jr., Westland, MI (US); Anil K. Sahoo, Westland, MI (US); Robert D. Clisch, Plymouth, MI (US)

(73) Assignee: Yazaki North America, Inc., Canton, MI (US)

(*) Notice: Subject to any disclaimer, the term of this patent is extended or adjusted under 35 U.S.C. 154(b) by 966 days.

(21) Appl. No.: 13/592,516

(22) Filed: Aug. 23, 2012

(65) Prior Publication Data

US 2014/0054064 A1  Feb. 27, 2014

(51) Int. Cl.
*H02G 3/22* (2006.01)
*H02G 3/18* (2006.01)
*B60R 16/02* (2006.01)

(52) U.S. Cl.
CPC .................. *B60R 16/0222* (2013.01)

(58) Field of Classification Search
CPC .................................................. B60R 16/0222
USPC ............................................... 174/152 G, 650
See application file for complete search history.

(56) References Cited

U.S. PATENT DOCUMENTS

| | | | | |
|---|---|---|---|---|
| 2,961,691 A * | 11/1960 | Roy | ..................... | C25D 7/0607 16/2.1 |
| 3,229,026 A * | 1/1966 | Sulzer | .................. | H02G 3/0616 16/2.1 |
| 3,506,999 A * | 4/1970 | Neher | ...................... | B66B 7/06 16/2.1 |
| 3,889,909 A * | 6/1975 | Koscik | ..................... | H02G 3/22 248/56 |
| 3,918,667 A * | 11/1975 | Madden | .................... | F16L 5/00 248/300 |
| 4,640,479 A * | 2/1987 | Shely | ................... | H02G 3/0641 16/2.2 |
| 4,993,724 A * | 2/1991 | Hauff | ........................ | F16L 5/08 277/606 |
| 6,010,134 A * | 1/2000 | Katoh | ................. | B60R 16/0222 174/152 G |
| 6,083,023 A | 7/2000 | Kamath | | |
| 6,218,625 B1 * | 4/2001 | Pulaski | ............... | B60R 16/0222 174/153 G |
| 6,353,185 B1 * | 3/2002 | Sakata | ..................... | H02G 3/18 16/2.1 |
| 6,376,777 B1 * | 4/2002 | Ito | ........................ | H02G 3/0468 16/2.1 |
| 6,627,817 B1 * | 9/2003 | Kortenbach | ........... | H02G 3/083 174/541 |
| 6,660,937 B1 * | 12/2003 | MacLeod | ............ | B60R 16/0222 16/2.2 |
| 6,815,615 B1 | 11/2004 | Haulotte et al. | | |
| 6,822,165 B2 * | 11/2004 | Nishimoto | .......... | B60R 16/0222 16/2.1 |
| 6,995,316 B1 * | 2/2006 | Goto | .................... | H02G 15/013 16/2.1 |
| 7,020,931 B1 | 4/2006 | Burnett et al. | | |
| 7,087,839 B2 | 8/2006 | Gajewski | | |
| 7,098,401 B1 | 8/2006 | Herald et al. | | |
| 7,105,750 B1 | 9/2006 | Duhr | | |
| 7,244,894 B1 | 7/2007 | Lipp | | |
| 7,943,854 B1 | 5/2011 | Lipp | | |
| 2001/0020536 A1 * | 9/2001 | Kondoh | .............. | B60R 16/0222 174/650 |
| 2005/0148212 A1 * | 7/2005 | Ojima | ................. | B60R 16/0215 439/34 |

(Continued)

*Primary Examiner* — Timothy Thompson
*Assistant Examiner* — Rhadames J Alonzo Miller
(74) *Attorney, Agent, or Firm* — Harness, Dickey & Pierce, P.L.C.

(57) ABSTRACT

A grommet assembly that has a retainer and a grommet that is coupled to the retainer. The retainer includes first and second body portions that are connected via a hinge that permits the first and second body portions to be spread apart into an open condition to receive a wire harness. The retainer also includes a latch that permits the first and second body portions to be held in a closed position. The grommet is coupled to the retainer and is configured to form a seal about the retainer. The grommet can have seal members that sealingly engage one another when the retainer is latched in the closed position. Additionally or alternatively, the retainer can have a channel that is configured to support a wire harness and the grommet can have a resilient tubular portion that can be stretched over the channel and the wire harness.

13 Claims, 7 Drawing Sheets

(56) References Cited

U.S. PATENT DOCUMENTS

| | | | |
|---|---|---|---|
| 2009/0065235 A1* | 3/2009 | Uchibori | B60R 16/0222 174/152 G |
| 2009/0302034 A1* | 12/2009 | Makela | H02G 3/0658 220/3.8 |
| 2010/0307817 A1* | 12/2010 | Roy | H02G 3/185 174/666 |
| 2010/0314158 A1* | 12/2010 | Suzuki | B60R 16/0222 174/152 G |
| 2011/0211326 A1* | 9/2011 | Drouard | G02B 6/3827 361/814 |
| 2012/0048616 A1* | 3/2012 | Breen, IV | H02G 3/22 174/651 |
| 2012/0181754 A1* | 7/2012 | Levi | H02G 3/088 277/616 |

* cited by examiner

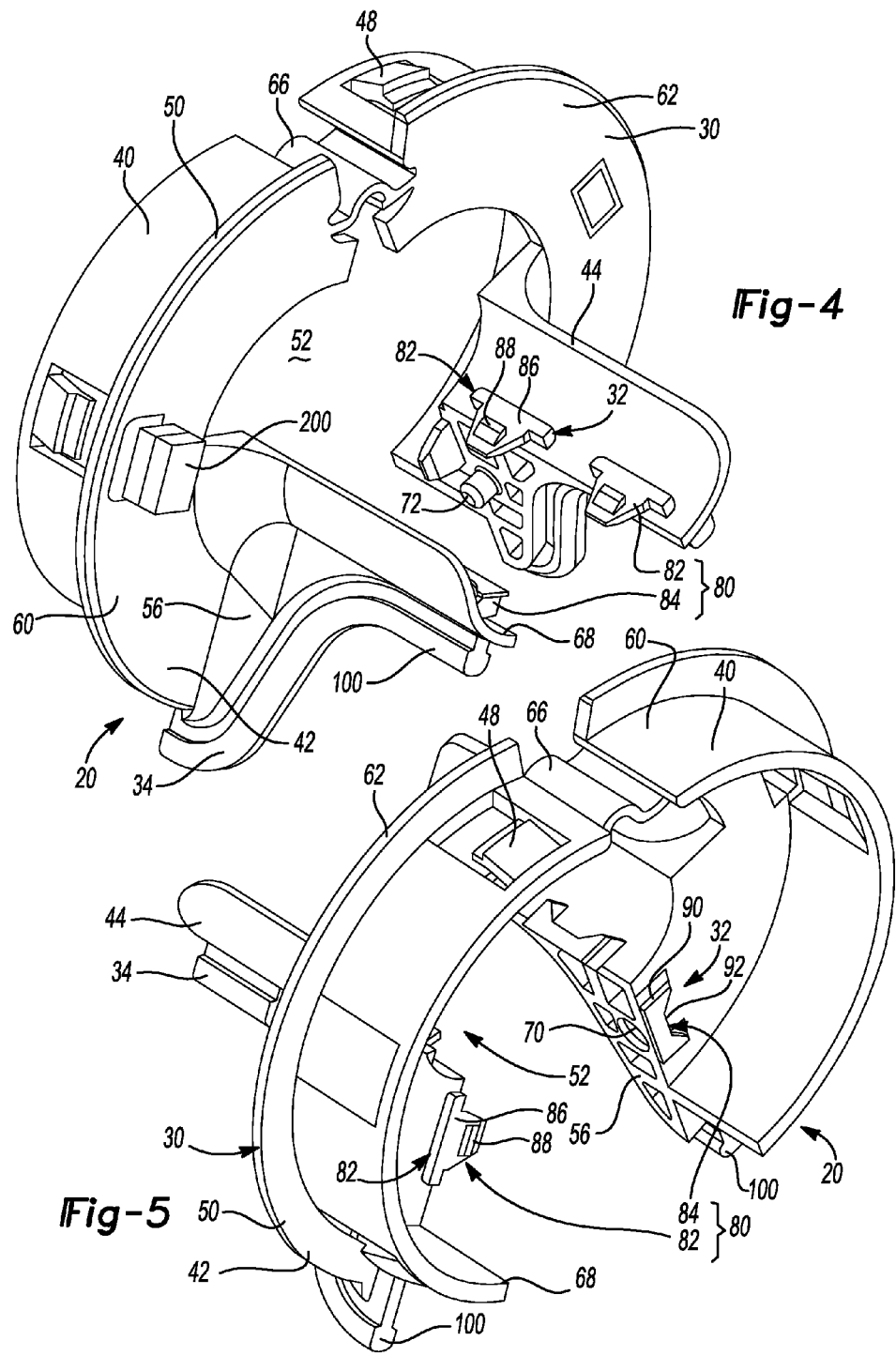

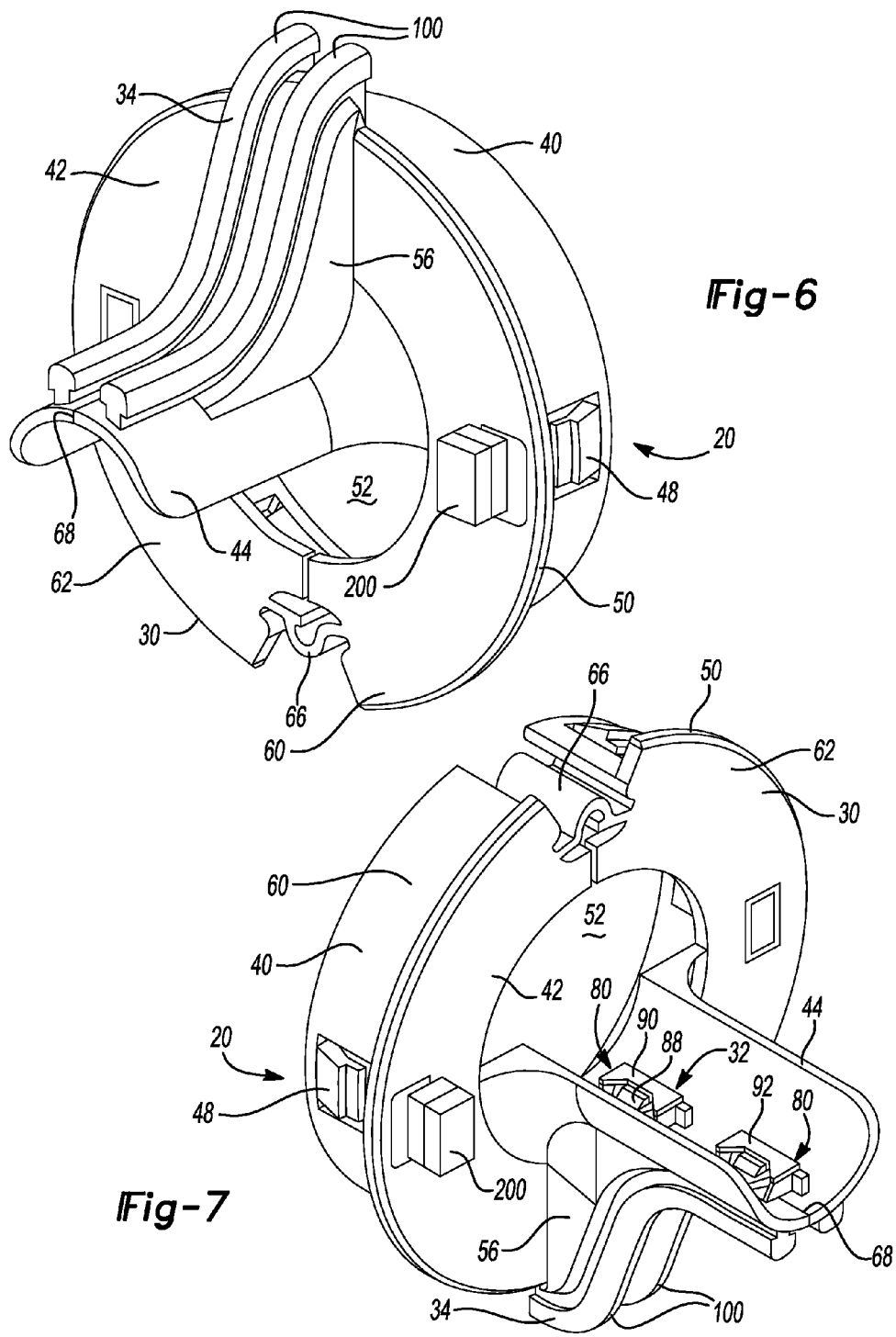

GROMMET ASSEMBLY

FIELD

The present disclosure relates to a grommet assembly.

BACKGROUND

This section provides background information related to the present disclosure which is not necessarily prior art.

Various types of wire harness grommets are known in the art. One type of wire harness grommet typically includes an elastomeric grommet that is assembled over a wire harness and installed to a panel. Such grommets can be installed to the wire harness as the wire harness is being fabricated, but installation of the grommet to the wire harness in this manner is not desirable for several reasons, including the ability to remove and replace the grommet. Split grommets are known in the art, but the known split grommets can be difficult to seal.

SUMMARY

This section provides a general summary of the disclosure, and is not a comprehensive disclosure of its full scope or all of its features.

In one form, the present teachings provide a grommet assembly that includes a retainer and a grommet. The retainer has a retainer body, a latch and a set of first engaging features. The retainer body has a harness aperture formed there through. The retainer body includes a first body portion, a second body portion and a hinge that flexibly couples the first and second body portions to one another such that a first slit is formed between the first and second body portions and the second body portion can be moved away from the first body portion to open the first slit by an amount that is adapted to permit a wire harness to be received radially through the retainer body and into the wire harness aperture. The latch is coupled to the body and is configured to secure the first and second body portions in a first position. The first set of engaging features is coupled to the retainer body on opposite sides of the first slit. The grommet has a grommet body and a set of second engaging features. The grommet body defines a second slit and first and second seal members that are disposed on opposite sides of the slit. The grommet body is mounted onto the retainer such that the second slit is aligned to the first slit. The set of second engaging features are coupled to the grommet body on opposite sides of the second slit. The set of second engaging features are engaged to the set of first engaging features such that movement of the second body portion relative to the first body portion in a direction that closes the first slit also causes closure of the second slit. The first and second seal members are compressed against one another when the latch secures the first and second body portions in the first position.

In another form, the present teachings provide a grommet assembly that includes a retainer and a grommet. The retainer has a retainer body and a latch. The retainer body has a harness aperture formed therethrough and includes a first body portion, a second body portion and a hinge that flexibly couples the first and second body portions to one another such that a first slit is formed between the first and second body portions. The second body portion can be moved away from the first body portion to open the first slit by an amount that is adapted to permit a wire harness to be received radially through the retainer body and into the wire harness aperture. The retainer body defines a channel that bounds an edge of the harness aperture. The latch is coupled to the body and is configured to secure the first and second body portions in a first position. The grommet has a grommet body that defines a second slit. The grommet is mounted to the retainer such that the second slit is aligned to the first slit. The grommet body has a tubular portion that is disposed about the channel and formed of a resilient material that is adapted to stretch to accommodate the wire harness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a front bottom perspective view of a portion of the grommet assembly of FIG. 1, illustrating a retainer in an open condition;

FIG. 4 is a front top perspective view of the retainer in an open condition;

FIG. 5 is a rear top perspective view of the retainer in an open condition;

FIG. 6 is a front bottom perspective view of the retainer in a closed condition;

FIG. 7 is a front top perspective view of the retainer in a closed condition;

Corresponding reference numerals indicate corresponding parts throughout the several views of the drawings.

DETAILED DESCRIPTION

Figure 1:
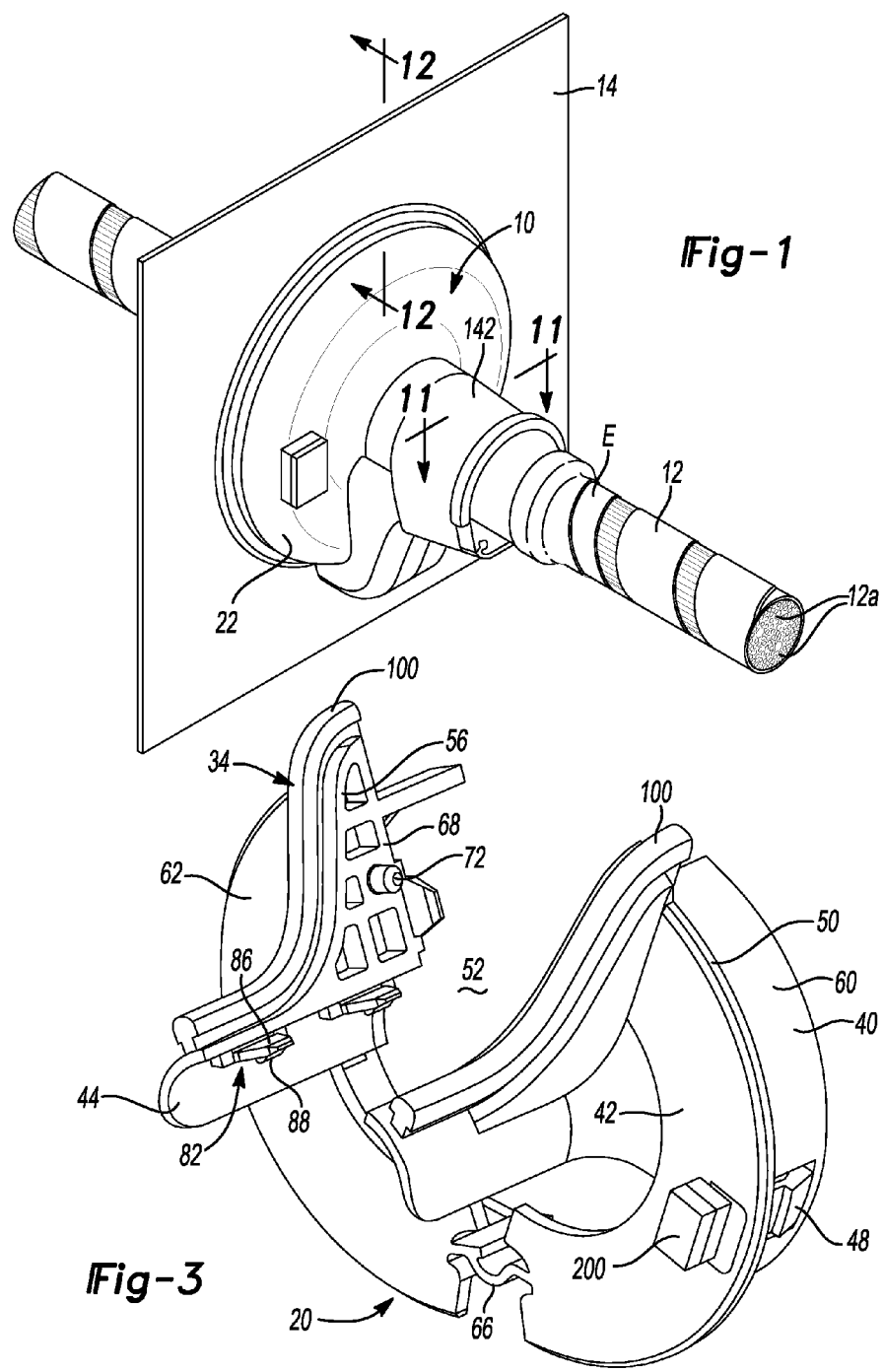
FIG. 1 is a perspective view of a grommet assembly constructed in accordance with the teachings of the present disclosure, the grommet assembly being illustrated in operative association with a wire harness and a panel.
Figure 2:
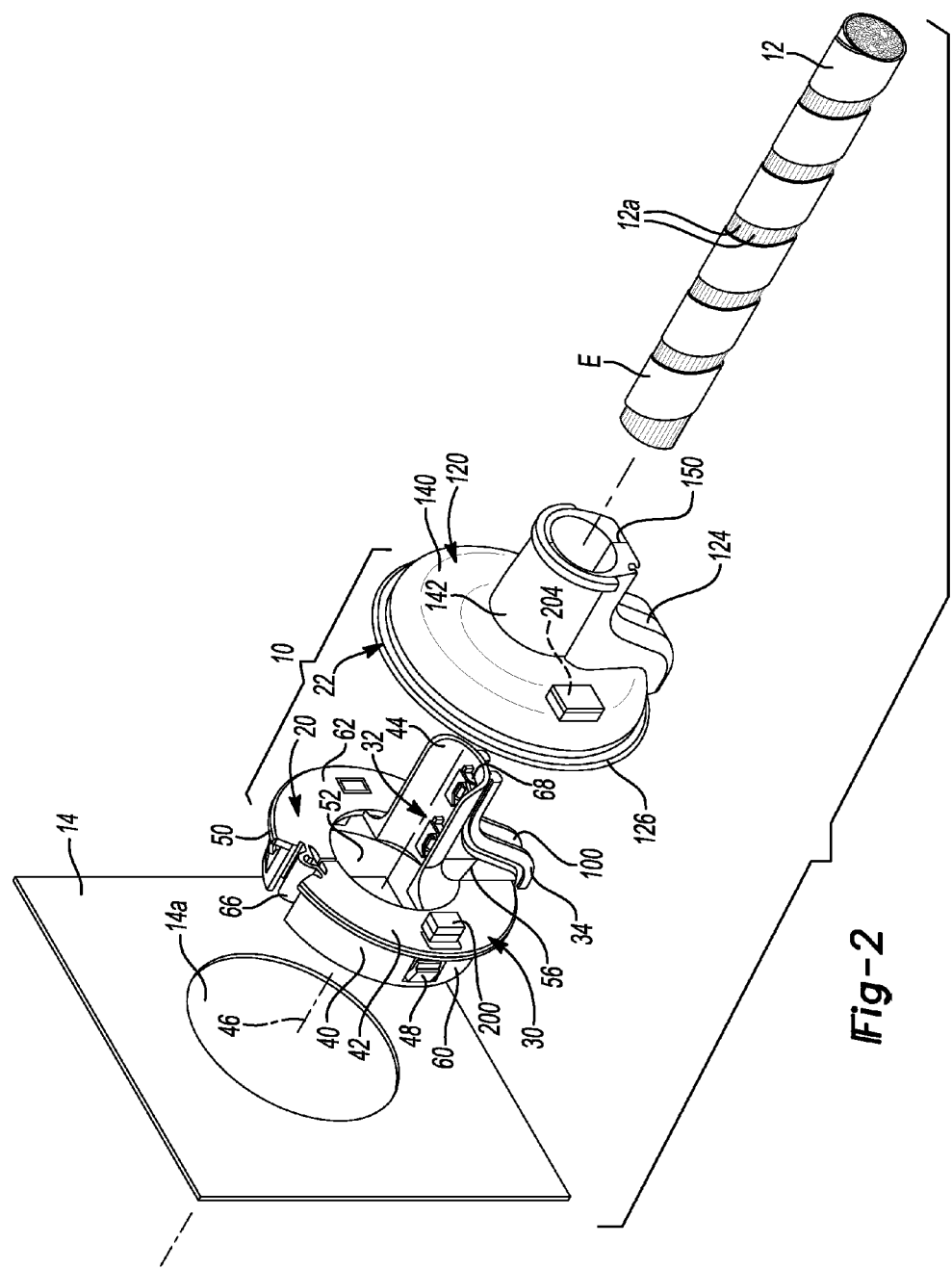
FIG. 2 is an exploded perspective view of the grommet assembly, wire harness and panel assembly illustrated in FIG. 1.

With reference to FIGS. 1 and 2 of the drawings, a grommet assembly constructed in accordance with the teachings of the present disclosure is generally indicated by reference numeral 10. The grommet assembly 10 is shown in operative association with a wire harness 12 and installed to a panel 14. The wire harness 12 can be conventionally constructed from a plurality of discrete insulated wires 12a and may include various connectors, fuses, solid-state circuitry, etc. The panel 14 can be formed of a suitable material, such as painted sheet metal, and can define a panel aperture 14a into which the grommet assembly 12 is received. In the particular example provided, the panel 14 comprises a portion of a vehicle body, but those of skill in the art will appreciate that the panel 14 could be any other type of structure and as such, the present disclosure is not limited to an automotive context. The grommet assembly 10 can includes a retainer 20 and a grommet 22.

With reference to FIGS. 2 and 3, the retainer 20 can have a retainer body 30, a latch 32 and a first set of engaging features 34. The retainer 20 can be unitarily formed of any desired material, such as a thermoplastic material. In the example provided, the retainer 20 is unitarily formed of a thermoplastic via injection molding.

With reference to FIGS. 3 through 7, the retainer body 30 can define a rim 40, a flange 42 and a channel 44. The rim 40 can have an annular shape that can extend axially along a longitudinal axis 46 of the retainer body 30. The rim 40 can be sized to be received into the panel aperture 14a (FIG. 2) and can include a plurality of resilient fingers 48 that can be configured to engage the panel 14 (FIG. 2) as will be discussed in more detail below. The flange 42 can be coupled to an end of the rim 40 so as to be disposed between the rim 40 and the channel 44. The flange 42 can have an annular shape that can extend radially outwardly of the rim 40 to define a shoulder 50. The flange 42 can also extend radially inwardly of the rim 40 and can define a harness aperture 52 that is configured to receive the wire harness 12 therein. The channel 44 can be configured with an inner surface that cradles the wire harness 12 (FIG. 2) to a desired extent. In the particular example provided, the channel 44 is configured to support the wire harness 12 (FIG. 2) against gravity when the grommet assembly 10 and the wire harness 12 (FIG. 2) are installed to the panel 14 (FIG. 2) so that the inside surface of the channel 44 is generally trough-shaped so as to be able to extend about the lateral sides of the wire harness 12 (FIG. 2) to aid in maintaining the wire harness 12 (FIG. 2) in a position that is aligned to the longitudinal axis 46 of the retainer body 30. If desired, one or more gussets 56 can be coupled to the channel 44 and the flange 42 to support the channel 44 against the weight of the wire harness 12 (FIG. 2).

The retainer body 30 can be segregated into a first body portion 60 and a second body portion 62, and a hinge 66 can be employed to pivotably or flexibly couple a side of the first body portion 60 to a corresponding side of the second body portion 62. The hinge 66 can permit the first and second body portions 60 and 62 to be positioned in an open position where the first and second body portions 60 and 62 are spread apart from one another, i.e., to form a first slit 68 on a side opposite the hinge 66 as shown in FIGS. 3 through 5, so that the wire harness 12 (FIG. 2) can be received through the first slit 68 in the retainer body 30 into the harness aperture 52. In the particular example provided, the first and second body portions 60 and 62 are configured such that they bisect the channel 44, but those of skill in the art will appreciate that the first and second body portions 60 and 62 could be configured differently and/or that the retainer 20 could be configured with more than two body portions. If desired, features can be integrated into the retainer body 30 to ensure that the first and second body portions 60 and 62 are properly aligned to one another when positioned in the closed position. In the example provided, the first body portion 60 comprises a guide aperture 70 (FIG. 5) into which a guide pin 72 (FIGS. 3 and 4) that is coupled to the second body portion 62 is received when the first and second body portions 60 and 62 are in the closed position.

Figure 8:
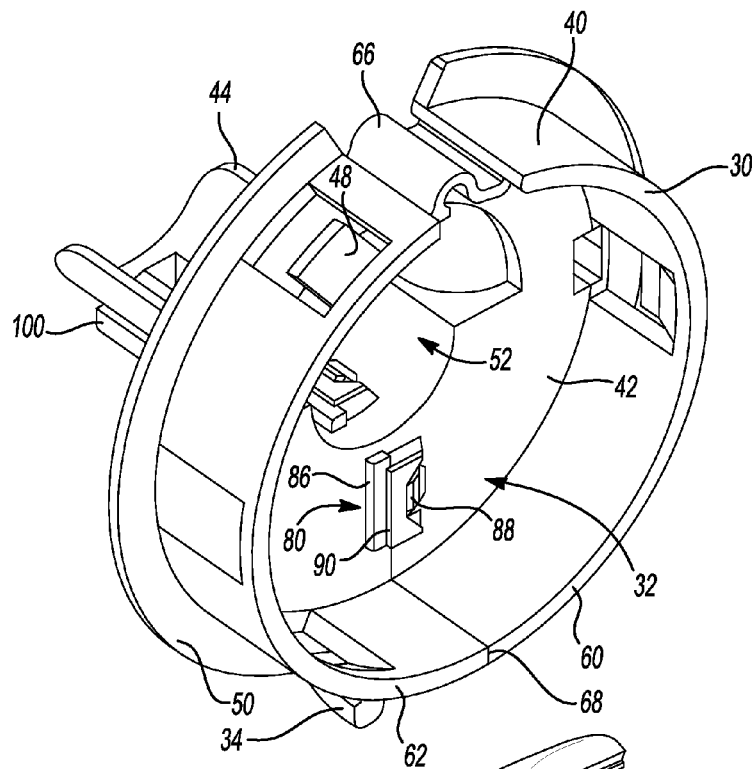
FIG. 8 is a rear top perspective view of the retainer in a closed condition.

The latch 32 can be configured to hold the first and second body portions 60 and 62 in position (i.e., a closed position) where the first slit 68 is closed as is shown in FIGS. 6 through 8. Any type of latching means could be employed, but in the particular example provided, the latch 32 comprises a plurality of latch sets 80, with each latch set 80 having a first latch member 82 that is fixedly coupled to (e.g., unitarily formed with) the first body portion 60 and a second latch member 84 that is fixedly coupled to (e.g., unitarily formed with) the second body portion 62. The first and second latch members 82 and 84 can be configured in any desired manner so that they can be lockably engaged to one another. In the particular example provided, the first latch members 82 comprise a tab 86 with a locking protrusion 88, which the second latch members 84 comprise a cage 90 that is configured to receive the tab 86 of a corresponding one of the first latch members 82. The cage 90 can define an abutting wall 92 against which the locking protrusion 88 can engage to thereby resist withdrawal of the tab 86 from the cage 90. Any desired quantity of the latch sets 80 could be employed, and the latch sets 80 could be positioned in any manner desired. In the example provided, two latch sets 80 are employed to couple the portions of the channel 44 together, while another latch set 80 is employed to couple the portions of the flange 42 together.

The first set of engaging features 34 can comprise two or more features, elements or structures that can be employed to anchor the grommet 22 (FIG. 2) to the first and second body portions 60 and 62 of the retainer body 30 on opposite sides of the first slit 68. In the particular example provided, the first set of engaging features 34 comprises a pair of ribs 100. Each rib 100 is coupled to a corresponding one of the portions of the channel 44 and an associated one of the gussets 56. Each rib 100 can define a barb portion 102 and a neck 104.

Figure 9:
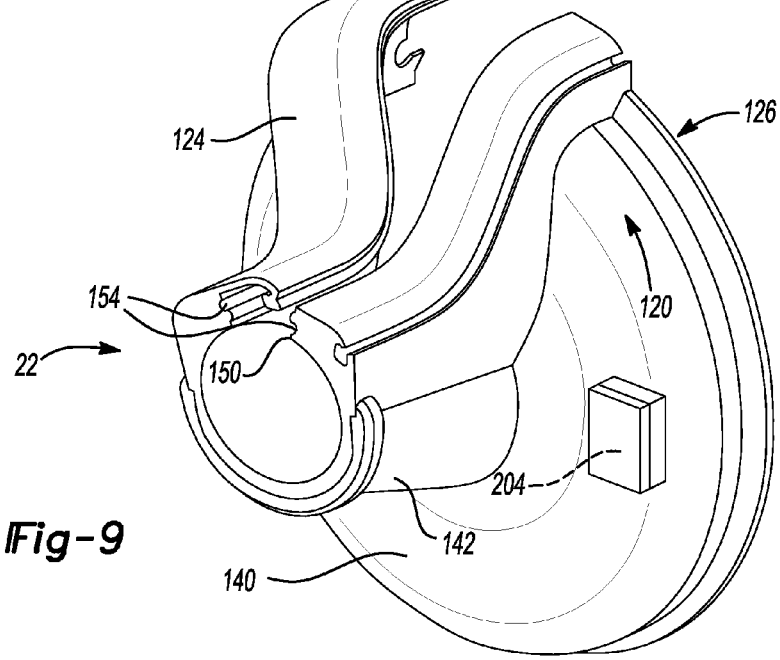
FIG. 9 is a front bottom perspective view of a portion of the grommet assembly of FIG. 1, illustrating a grommet in an open condition.
Figure 10:
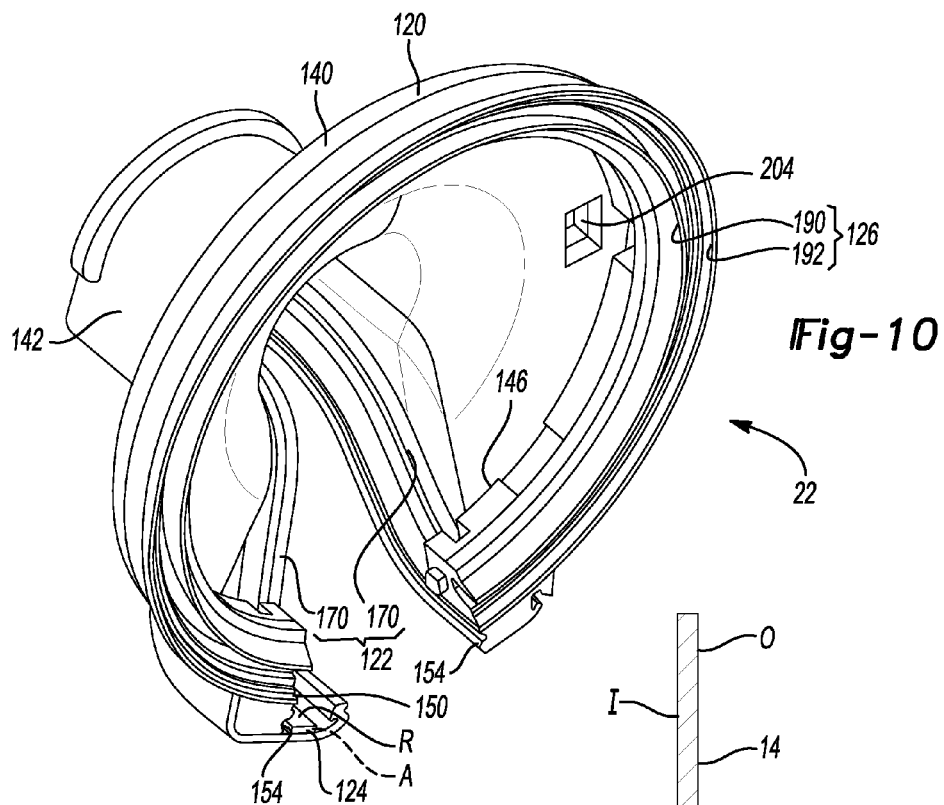
FIG. 10 is a rear top perspective view of the grommet in an open condition.

With reference to FIGS. 2, 9 and 10, the grommet 22 can comprise a grommet body 120, a set of second engaging features 122, a seal flap 124 and a panel seal 126. The grommet 22 can be unitarily formed of a suitable material, such as a thermoplastic elastomer. In the particular example provided, the grommet 22 is formed as a discrete component that is assembled to the retainer 20, as will be discussed in more detail below, but those of skill in the art will appreciate that in some situations, it may be desirable to mold the grommet 22 onto the retainer 20.

The grommet body 120 can have a saucer-shaped portion 140, which is configured to be mounted to the flange 42, and a tubular portion 142 that is configured to be received over the channel 44. The saucer-shaped portion 140 can define a circumferentially extending groove 146 that can be configured to receive the shoulder 50. The grommet body 120 can define a second slit 150 and can have a pair of seal members 154 that can be disposed on opposite sides of the second slit 150. The seal members 154 are configured to sealingly engage one another and can be sized and shaped in any desired manner.

Figure 11:
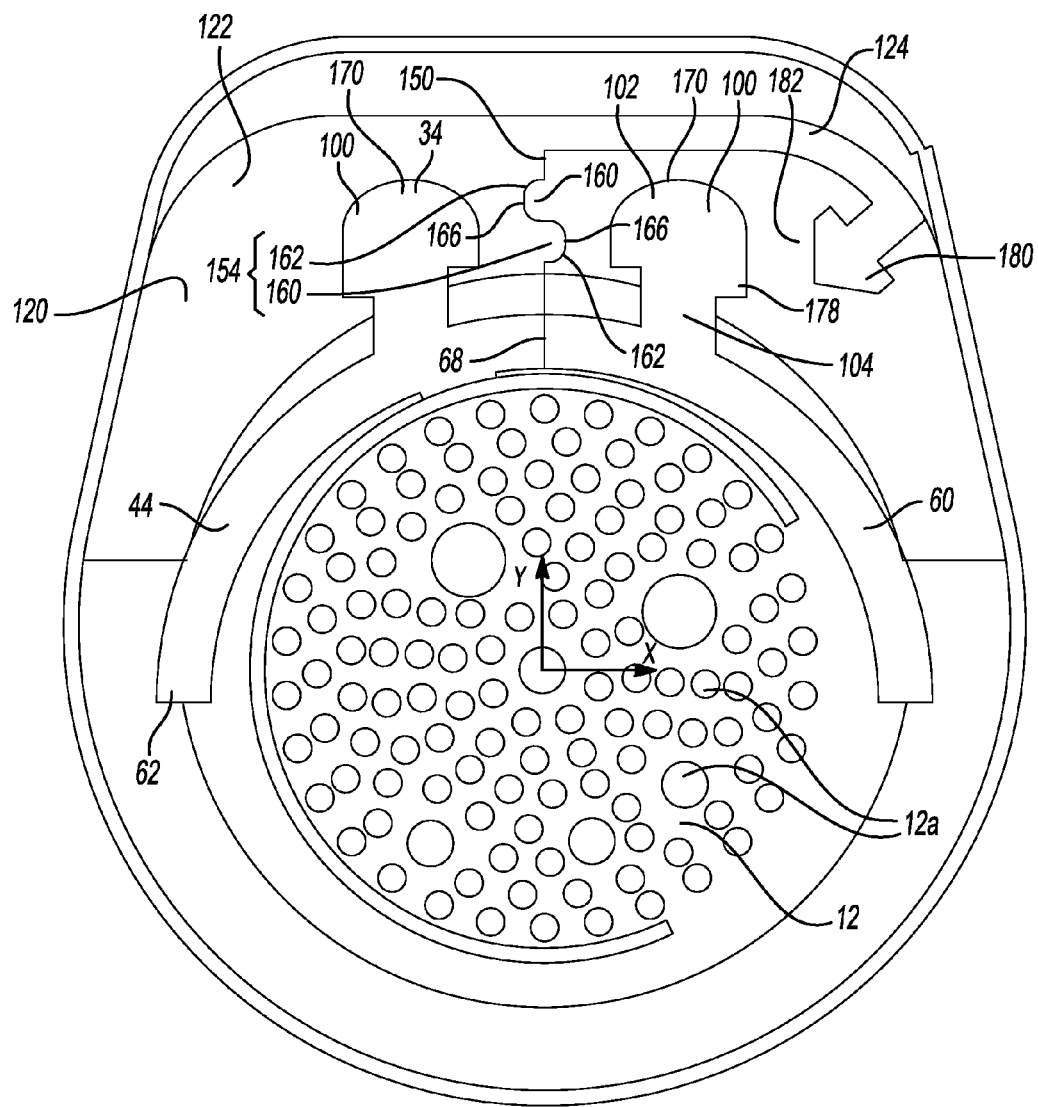
FIG. 11 is a section view taken along the line 11-11 of FIG. 1.

With reference to FIG. 11, each seal member 154 can comprise a rib 160 and a groove 162 that can be formed onto a corresponding edge of the second slit 150. The rib 160 can be semi-cylindrically shaped so as to present a generally convex longitudinally extending outer surface. The groove 162 can also be generally semi-cylindrically shaped and configured to receive the rib 160 of the seal member 154 on the opposite side of the second slit 150. If desired, the groove 162 can be defined by a radius that is somewhat larger than a radius that defines the rib 160. Additionally or alternatively, the groove 162 can be configured with one or more flat lands 166 that are configured to contact the rib 160 of the seal member 154 on the opposite side of the second slit 150. In the particular example provided, a single flat land 166 is employed in the center of each groove 162 to ensure that sealing contact between the seal members 154 is provided along two distinct and discrete paths that are separated both axially and vertically (as shown in the X and Y directions in FIG. 11) from one another. In this regard, the grooves 162 can be sized to permit the rib 160 on the opposite side of the second slit 150 to compress when contact is made with between the rib 160 and the flat land 166 as the second slit 150 is closed. Configuration in this manner provides a relatively low-cost redundant seal that helps to inhibit the infiltration of moisture through the second slit 150.

The set of second engaging features 122 can be disposed on opposite sides of the second slit 150 and can be configured to matingly engage corresponding ones of the set of first engaging features 34 so that movement of the second body portion 62 relative to the first body portion 60 in a direction that closes the first slit 68 also causes closure of the second slit 150 (i.e., so that the seal members 154 sealingly engage one another). It will be appreciated that coupling of the set of second engaging features 122 to the set of first engaging features 34 can align the second slit 150 to the first slit 68. In the particular example provided, the set of second engaging features 122 comprises a pair of grooves 170, wherein each of the grooves 170 is configured to receive a corresponding one of the ribs 100. The grooves 170 and the ribs 100 can be configured such that they lockingly engage one another. In the example provided, the neck 104 of each rib 100 extends from the channel 44 and the barbed portion 102 of the rib 100 is coupled to a distal side of the neck 104. The barbed portion 102 is sized relatively larger than the neck 104 so as to define two shoulders 178 on the opposite sides of the barbed portion 102 where the barbed portion 102 meets the neck 104. The grooves 170 can be sized and shaped in a mating fashion.

With reference to FIGS. 9 and 11, the seal flap 124 can be fixedly coupled to the grommet body 120 and can overlie or extend circumferentially past the second slit 150 over all or a portion of the length of the second slit 150. Stated another way, the seal flap 124 can overlie a radially outer side of the second slit 150. The seal flap 124 can carry a first locking member 180 that is engageable to a second locking member 182 carried by the grommet body 120. Engagement of the first locking member 180 to the second locking member 182 can inhibit movement of the seal flap 124 relative to the grommet body 120. In the particular example provided, the first locking member 180 comprises a barbed projection, while the second locking member 182 comprises a groove that is sized to receive the barbed projection. It will be appreciated that the configuration could be reversed so that the second locking member 182 comprises a barbed projection and wherein the first locking member 180 comprises a groove that is configured to receive the barbed projection. In addition to or in lieu of the first and second locking members 180 and 182, an adhesive A (FIG. 10) may be disposed radially between the seal flap 124 and the grommet body 120. To facilitate installation of the grommet assembly 10, a removable release strip R (FIG. 10) can be coupled to the adhesive A; the release strip R could be removed prior to adhering the seal flap 124 to the grommet body 120.

Figure 12:
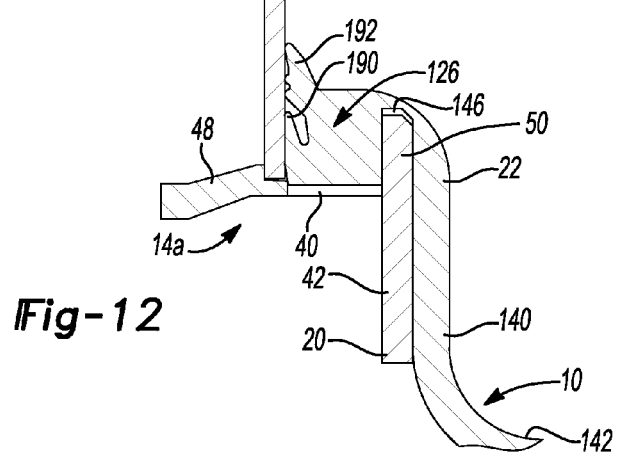
FIG. 12 is a section view taken along the line 12-12 of FIG. 1.

With reference to FIGS. 2, 10 and 12, the panel seal 126 can comprise any type of seal configuration that can be configured to sealingly engage the panel 14. In the particular example provided, the panel seal 126 comprises first and second lip seals 190 and 192, respectively, that extend axially rearward from the saucer-shaped portion 140 of the grommet body 120. The second seal lip 192 can be disposed concentrically about the first seal lip 190 and can extend in an axial direction by an amount that is different than (e.g., greater than) an amount by which the first seal lip 190 extends. Configuration in this manner can provide redundant sealing between the grommet 22 and the panel 14 in some situations, and can ensure that at least one seal is provided between the grommet 22 and the panel 14 in other situations where there is variability in the distance between the panel seal 126 and the area on the panel 14 that the panel seal 126 is configured to contact.

With reference to FIGS. 2, 4, 5, 9 and 10, the grommet 22 can be assembled to the retainer 20 such that the sets of first and second engaging features 34 and 122 are engaged to one another, the first and second slits 68 and 150 are aligned to one another and the shoulder 50 on the flange 42 is received into the circumferentially extending groove 146 in the saucer-shaped portion 140 of the grommet body 120. Additionally, one or more sets of mating locating features, such as a boss 200 that extends axially from the flange 42 and a mating recess 204 formed into the saucer-shaped portion 140 of the grommet body 120, can be employed to aid in locating and/or maintaining the grommet 22 in a predetermined radial orientation relative to the retainer 20.

The first and second body portions 60 and 62 of the retainer body 30 can be spread apart from one another to open the first and second slits 68 and 150 to permit the wire harness 12 to be received radially through the grommet 22 and the retainer 20 into the wire harness aperture 52. If desired, a sealant (not shown) may be applied around the perimeter of the wire harness 12 so as to create an additional seal between the wire harness 12 and an interior surface of the grommet assembly 10.

The first and second body portions 60 and 62 of the retainer body 30 can be moved to the closed position such that the seal members 154 on the grommet body 120 sealingly engage one another. The first latch members 82 can be engaged to the second latch members 84 to cause the latch 32 to hold the first and second body portions 60 and 62 in the closed position to thereby maintain the seal members 154 in sealing engagement with one another. With the grommet assembly 10 in this condition, it will be appreciated that the interior surface of the channel 44 is abutted against a first side of the wire harness 12 and that tubular portion 142 of the grommet body 120 is disposed around both the channel 44 and the remainder of the perimeter of the wire harness 12. Depending on the size of the wire harness 12 and the interior size of the tubular portion 142, the tubular portion 142 could be stretched as necessary to accommodate differently sized wire harnesses. It will be appreciated, however, that the tubular portion 142 need not be stretched about the wire harness 12 when the grommet assembly 12 is installed to the wire harness 12.

If desired, an adhesive may be placed onto one or both of the grommet body 120 and the seal flap 124 to aid in securing the seal flap 124 to the grommet body 120 to thereby cover a distal end of the second slit 150. In the example provided, the adhesive A is pre-installed to the seal flap 124 and the release strip R is removed from the adhesive to ready the seal flap 124 for permanent closure against the grommet body 120.

With reference to FIGS. 2 and 11, the first locking member 180 carried by the seal flap 124 can be engaged to the second locking member 182 carried by the grommet body 120 to help ensure permanent closure of the seal flap 124 to the grommet body 120. If desired, electrical tape E can be wound about the perimeter of the wire harness 12 and over a portion of the tubular portion 142 to help seal the interface between the grommet 22 and the wire harness 12.

With reference to FIGS. 2, 3 and 12, the wire harness 12 can be received through the panel aperture 14a in the panel 14 and the rim 40 of the retainer 20 can be installed to the panel 14. In the example provided, resilient cantilevered fingers 48 are integrally formed in the rim 40. The fingers 48 can deflect radially inwardly (due to contact with the inside edge of the portion of the panel 14 that defines the panel aperture 14) as the rim 40 is inserted into the panel 14 and the first and second seal lips 190 and 190 can deflect against an outer surface O of the panel 14 until the grommet assembly 10 as the grommet assembly 10 is pushed into the panel 14. Once past the panel 14, the fingers 48 can deflect outwardly so that when the grommet assembly 10 is released, a force generated by the panel seal 126 will urge the fingers 48 into abutment with the inner surface I of the panel 14 to thereby secure the grommet assembly 10 to the panel 14. In this installed position, the channel 44 of the grommet assembly 10 can be oriented to provide a modicum of strain relief to the wire harness 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grommet assembly comprising:
a retainer having a retainer body, a latch and a set of first engaging features, the retainer body having a harness aperture formed there through, the retainer body comprising a first body portion, a second body portion and a hinge that flexibly couples the first and second body portions to one another such that a first slit is formed between the first and second body portions and the second body portion can be moved away from the first body portion to open the first slit by an amount that is adapted to permit a wire harness to be received radially through the retainer body and into the wire harness aperture, the latch being coupled to the body and being configured to secure the first and second body portions in a first position, the first set of engaging features being coupled to the retainer body on opposite sides of the first slit; and
a grommet having a grommet body and a set of second engaging features, the grommet body defining a second slit, the grommet body having a first seal member, which is disposed on a first side of the second slit, and a second seal member that is disposed on a second side of the second slit, the grommet body being mounted onto the retainer such that the second slit is aligned to the first slit, the set of second engaging features being coupled to the grommet body on opposite sides of the second slit, the set of second engaging features being engaged to the set of first engaging features such that movement of the second body portion relative to the first body portion in a direction that closes the first slit also causes closure of the second slit;
wherein the first and second seal members are compressed against one another when the latch secures the first and second body portions in the first position.

2. The grommet assembly of claim 1, wherein the grommet further comprises a seal flap that is fixedly coupled to the grommet body and which overlies a radially outer side of the second slit.

3. The grommet assembly of claim 2, wherein a first locking member is carried by the seal flap, the first locking member being engageable to a second locking member carried by the grommet body to inhibit movement of the seal flap relative to the grommet body.

4. The grommet assembly of claim 3, wherein the first locking member comprises a barbed projection and wherein the second locking member comprises a groove that is configured to receive the barbed projection.

5. The grommet assembly of claim 2, further comprising an adhesive that is disposed radially between the seal flap and the grommet body.

6. The grommet assembly of claim 5, further comprising a removable release strip coupled to the adhesive.

7. The grommet assembly of claim 1, wherein one of the sets of first and second engaging features comprises a plurality of ribs, wherein the other one of the sets of first and second engaging features comprises a plurality of grooves, and wherein each of the grooves is configured to receive a corresponding one of the ribs.

8. The grommet assembly of claim 7, wherein the ribs and the grooves lockingly engage one another.

9. The grommet assembly of claim 1, wherein each of the first and second seal members comprises a semi-cylindrical rib.

10. The grommet assembly of claim 8, wherein each of the first and second seal members comprises a groove, wherein the semi-cylindrical rib of the first seal member is received in the groove of the second seal member, and wherein the semi-cylindrical rib of the second seal member is received in the groove of the first seal member.

11. The grommet assembly of claim 9, wherein each groove has a flat land against which an associated one of the semi-cylindrical ribs abuts, and wherein the semi-cylindrical ribs are compressed against the flat lands when the latch secures the first and second body portions in the first position.

12. The grommet assembly of claim 1, wherein the grommet further comprises first and second seal lips coupled to an axial end of the grommet body, the second seal lips being disposed concentrically about the first seal lips.

13. The grommet assembly of claim 12, wherein the first seal lips extend from the grommet body by a first distance, and wherein the second seal lips extend from the grommet body by a second distance that is greater than the first distance.

* * * * *